Dec. 2, 1969 G. EMDE 3,482,132

LOGICAL NETWORK

Filed Feb. 27, 1967 2 Sheets-Sheet 1

Inventor:
Günter Emde
By McGlew and Toren
Attorneys

Inventor:
Günter Emde
By MacGlew and Toren
attorneys

United States Patent Office 3,482,132
Patented Dec. 2, 1969

3,482,132
LOGICAL NETWORK

Günter Emde, Neubiberg, Germany, assignor to Bolkow Gesellschaft mit beschrankter Haftung, Ottobrunn, near Munich, Germany Filed Feb. 27, 1967, Ser. No. 618,834
Claims priority, application Germany, Mar. 3, 1966, B 86,061
Int. Cl. H03k 19/20
U.S. Cl. 307—210 5 Claims

ABSTRACT OF THE DISCLOSURE

The disclosure relates to a logical network for forward-backward discrimination, with simultaneous pulse multiplication, of two mutually phase-displaced signal sequences of an increment signal generator. The logical network includes a pair of input lines, one for each of the signal sequences, and a series of output lines. The input lines are connected to the output lines by a network of electronic components including input AND gates, flip-flop stages, output AND gates and output OR gates.

The output lines are arranged for connection to a following counter, and the network connections are such that one output line feeds odd numbered forward counting pulses to the counter, a second output line feeds even numbered forward counting pulses to the counter, a third output line feeds odd numbered backward counting pulses to the counter and a fourth output line feeds even numbered backward counting pulses to the counter.

Background of the invention

In order to determine linear and angular dimensions, it is known practice to convert these dimensions, for example, by scanning line gratings or the like, into pulse sequences for producing a digital value corresponding to the analog quantity. To be able to distinguish the direction of measurement, as, for example, to distinguish between "forward" and "backward" counting, two signal sequences usually are used, and these are formed, for example, by mutual spatial displacement of two line gratings.

These signal sequences from an analog-digital converter, also known as an increment generator, must now be transformed into counting pulses to be processed, for example, by a counter, with simultaneously discrimination between forward and backward counting.

There is known, for example, from Steinbuch: "Taschenbuch der Nachrichtenverarbeitung" (Manual of Communications Processing) (1962), page 759, figure 5.8/3 a discriminator circuit where, depending on the counting direction, a pulse sequence representing the counting increments occurs at one of two different outputs. A circuit arrangement arrangement of this type has a disadvantage that, due to the dynamic discrimination during a change of counting direction at the instant of pulse generation, pulses occur nearly simultaneously at both outputs. Alternatively, the pulses may impair one another in an uncontrollable manner. Consequently, a perfect counting of the pulses by a following counter cannot be insured. Additionally, such a discriminator circuit furnishes, for each time period given by the division of the increment generator, only one pulse, or at the most two pulses, suitable for counting. Thus, the higher resolution obtained by spatial displacement of two line gratings is consequently lost again.

Recently, static counters have been frequently used for forward-backward counting, because these static counters are more reliable than dynamic counters at a reversal of the counting direction, that is, from adding to subtracting and vice versa. Furthermore, the static counters are not responsive to short interference pulses. However, a static counter requires, at its input, statically evaluable pulse sequences, and not the spike pulses customarily used for dynamic counters.

Summary of the invention

The invention provides a circuit arrangement for static forward and backward discrimination of two pulse sequences of an increment generator and which provides the highest possible power of resolution. In accordance with the invention, and using a logical network for forward-backward discrimination, with simultaneous pulse multiplication, of two mutually phase-displaced signal sequences of an increment signal generator, additional distinction between even numbered and odd numbered increments within an increment sequence is obtained if the logical network will fulfill the following, or equivalent, defining equations of Boolean algebra:

$$Fo=(\bar{A}\wedge B\wedge C)\vee(A\wedge\bar{B}\wedge\bar{C})$$
$$Fe=(\bar{A}\wedge\bar{B}\wedge D)\vee(A\wedge B\wedge\bar{D})$$
$$Bo=(A\wedge\bar{B}\wedge C)\vee(\bar{A}\wedge B\wedge\bar{C})$$
$$Be=(A\wedge B\wedge D)\vee(\bar{A}\wedge\bar{B}\wedge\bar{D})$$

In these equations, the momentary binary states of the output lines are designated Fo for forward odd numbered pulses, Fe for forward even numbered pulses, Bo for backward odd numbered pulses and Be for backward even numbered pulses. The symbols A, $\bar{A}$, B and $\bar{B}$ designate the binary states of the input lines, and the symbols C, $\bar{C}$, D and $\bar{D}$ designate the states of flip-flop circuits which serve as storage places for the particular preceding state combinations of the input lines.

With the logical network of the invention, it is possible, using only two flip-flops acting as storage places, to determine, from the states of these flip-flops and the momentary increment signals occurring at the input lines, whether a new increment is present, whether it is to be added or subtracted, and finally whether it is an even numbered or an odd numbered increment within an increment sequence. At the output lines corresponding to these classifications, statically evaluable counting pulses for a succeeding static counter are thus available.

By evaluating every change of the states of the input lines, the high power of resolution attained by the line gratings of the increment generator, which are mutually spatially displaced by a quarter period, for example, is preserved. During each period of an input signal as determined by the increment generator, four output pulses, suitable for counting, are supplied, so that an effective pulse multiplification occurs.

Accordingly, an object of the present invention is to provide a novel circuit arrangement for static forward-backward discrimination of two pulse sequences of an increment generator.

Another object of the invention is to provide such a circuit arrangement which is characterized by minimum circuit expense and a high reliability.

A further object of the invention is to provide a circuit arrangement for static forward-backward discrimination of two pulses sequences of an increment generator which is characterized by minimum circuit expense and high reliability even at rapidly succeeding changes of the counting direction and which provides the highest possible power of resolution.

Still another object of the invention is to provide such a circuit arrangement in which, using only two flip-flops acting as storage places, it is possible to determine from the states of these flip-flops and the momentary input increment signals whether a new increment is present, whether this new increment is to be added or subtracted, and whether the new increment is an even numbered increment or an odd numbered increment within an increment sequence.

Yet another object of the invention is to provide a circuit arrangement of the type just-mentioned in which, at the outputs of the circuit arrangement, statically evaluable counting pulses, for a following or succeeding static counter, are provided.

A further object of the invention is to provide such a logical network capable of evaluating every change of the states of the input lines to an extent sufficient to attain the high power of resolution attained by line gratings of an increment generator.

A still further object of the invention is to provide such a circuit arrangement in which, during a period of an input signal as determined by an increment generator, four output pulses, suitable for counting, are provided whereby there is an effective pulse multiplication.

Brief description of the drawings

For an understanding of the principles of the invention, reference is made to the following description of a typical embodiment thereof as illustrated in the accompanying drawings.

In the drawings.

Description of the preferred embodiment

Figure 1:
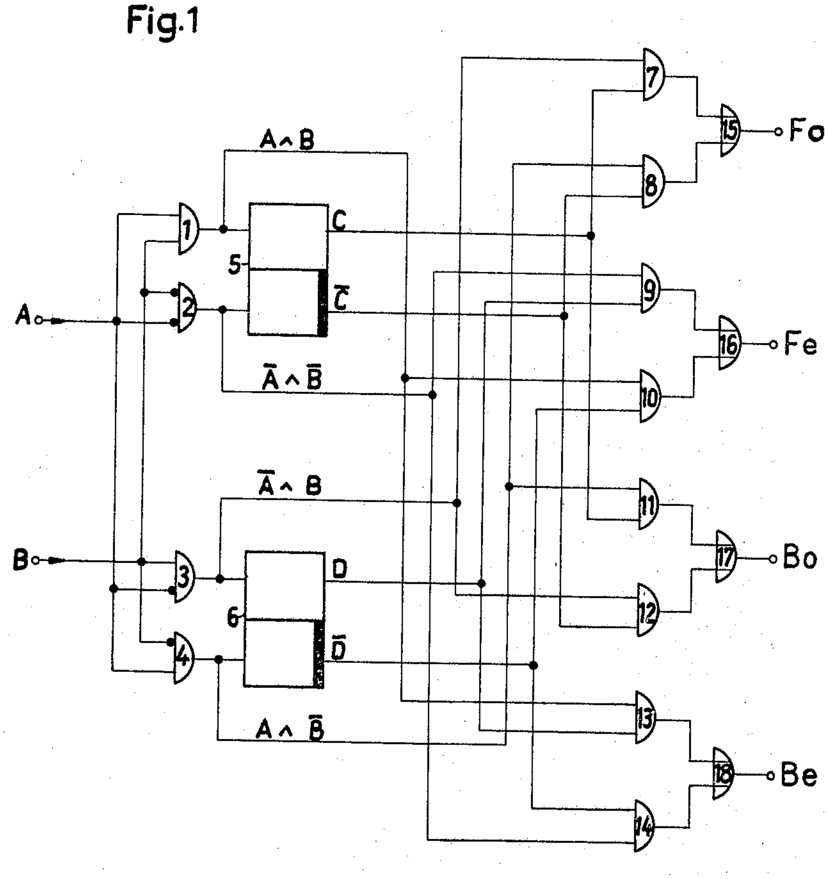
FIG. 1 is a schematic block diagram of a logical network embodying the invention.

Referring first to FIG. 1, the logical network has two inputs A and B, and the inversions of these inputs are indicated as $\overline{A}$ and $\overline{B}$. Inputs A and B are connected to AND members or gates 1, 2, 3 and 4 in parallel. AND member or gate 2 has inverted inputs $\overline{A}$ and $\overline{B}$, as indicated by the heavy black dots, AND member or gate 3 has an inverted input A and AND member or gate 4 has an inverter input $\overline{B}$.

Two flip-flops 5 and 6 are provided, each having a setting input and a resetting input. Each flip-flop also has a "first" output and "second" output and, in the following discussion, the "first" output of flip-flops 5 and 6 always refers to that output which, at the respective set flip-flop, shows state ONE or "1" and, at the respective reset flip-flop, shows state ZERO or "0." The first outputs of flip-flops 5 and 6 are indicated at C and D, respectively, and the second outputs at $\overline{C}$ and $\overline{D}$, respectively.

Referring to FIG. 1 again, the output of AND member or gate 1 is connected to the setting input of flip-flop 5, and the output of AND member 2 is connected to the resetting input of this flip-flop. The output of AND member 3 is connected or coupled with a setting input of flip-flop 6, and the output of AND member 4 is connected with a resetting input of this latter flip-flop. The outputs of flip-flops 5 and 6, and the outputs of the logical input circuits or AND members or gates 1, 2, 3 and 4 are coupled with the inputs of AND members or gates 7, 8, 9, 10, 11, 12, 13 and 14 as follows:

(1) The inputs of AND member or gate 7 are connected with the output of AND member or gate 3 and with the first output of flip-flop 5.

(2) The inputs of AND member or gate 8 are connected with the output of AND member or gate 4 and with the second output of flip-flop 5.

(3) The inputs of AND member or gate 9 are connected with the output of AND member or gate 2 and with the first output of flip-flop 6.

(4) The inputs of AND member or gate 10 are connected with the output of AND member or gate 1 and with the second output of flip-flop 6.

(5) The inputs of AND member or gate 11 are connected with the output of AND member or gate 4 and with the first output of flip-flop 5.

(6) The inputs of AND member or gate 12 are connected with the output of AND member or gate 3 and with the second output of flip-flop 5.

(7) The inputs of AND member or gate 13 are connected with the output of AND member or gate 1 and with the first output of flip-flop 6.

(8) The inputs of AND member or gate 14 are connected with the output of AND member or gate 2 and with the second output of flip-flop 6.

The outputs of AND members or gates 7 and 8 are connected, through an OR member or gate 15, with an output line F*o*. Similarly, the outputs of AND members or gates 9 and 10 are connected, through an OR member or gate 16, with an output line F*e*, the outputs of AND members or gates 11 and 12 are connected, through an OR member or gate 17, with an output B*o*, and the outputs of AND members or gates 13 and 14 are connected, through an OR member or gate 18, with an output line B*e*.

Figure 2:
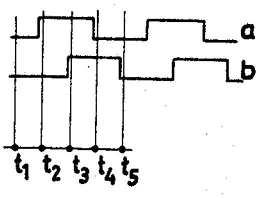
FIG. 2 is a graphical illustration of the pulse sequences supplied to the inputs of the logical network.

The input lines A and B of the logical network have supplied thereto the pulse sequences *a* and *b*, shown in FIG. 2, originating from an increment signal generator which has not been shown as it forms no part of the invention. In the time succession of the two mutually phase-displaced pulse sequences *a* and *b*, there can be distinguished four (4) different combinations of the states at the inputs A and B. Thus, at time $t_1$, both inputs A and B have the state "0"; at time $t_2$, input A has the state "1" and input B has the state "0"; at time $t_3$, both inputs A and B have the state "1"; at time $t_4$, input A has the state "0" and input B the state "1"; and at time $t_5$, the inputs have the same states as at time $t_1$. In the counting direction designated as "forward F," the state combinations follow each other in the order $t_1$–$t_2$–$t_3$–$t_4$–$t_1$, etc. For the opposite counting direction, designated "backward B," the order is $t_1$–$t_4$–$t_3$–$t_2$–$t_1$, etc.

At time $t_1$ flip-flops 5 and 6 of the logical network are in certain respective positions. It is assumed that this position still pertains from a state combination $\overline{A}$, B of the input lines, such as occurs, for example, at time $t_4$. Both flip-flops are set, so that the first outputs have the state "1."

At time $t_1$, in which inputs A and B both have the state "0," AND member or gate 2 is transmitting and thus flip-flop 5 is reset through its resetting input. Through the output of AND member or gate 2 and the first output of the set flip-flop 6, AND member or gate 9 becomes transmitting and there appears, through OR member or gate 16, a signal at output F*e*.

At time $t_2$, input A has the state "1" and input B has the state "0," so that AND member or gate 4 becomes transmitting and thus flip-flop 6 is reset through its resetting input. Through the output of AND member or gate 4 and the second output of reset flip-flop 5, AND member 8 becomes transmitting and there appears, through OR member 15, a signal at output F*o*.

At time $t_3$, both inputs A and B have the state "1," so that AND member or gate 1 becomes transmitting and flip-flop 5 is set through its setting input. Through the output of AND member or gate 1 and the second output of reset flip-flop 6, AND member 10 becomes transmitting and supplies, through OR member or gate 16, a signal to output F*e*.

At time $t_4$, input A has the state "0" and input B has the state "1," so that AND member or gate 3 becomes transmitting and flip-flop 6 is set through its setting input. Through the output of AND member or gate 3 and the first output of set flip-flop 5, AND member of gate 7 becomes transmitting and there appears a signal, through OR member 15, at output F*o*.

At time $t_5$, corresponding to time $t_1$, the state of both inputs A and B is "0," so that AND member or gate 2 becomes transmitting and flip-flop 5 is reset through its resetting input. At the same time, through the output of AND member or gate 2 and the first output of set flip-flop 6, AND member or gate becomes transmitting and thus, through OR member 16, a signal appears at output F*e*.

These various states of the inputs A and B, effected by the signal sequences *a* and *b*, repeat and there appear alternately, at the output lines F*o* and F*e* of the logical network, counting pulses which indicate the forward counting direction. This makes possible an addition in a succeeding counter which has not been shown and which forms no part of the present invention.

During a backward counting direction, starting, for example, at time $t_5$, the states of the two inputs A and B caused by the signal sequences *a* and *b* change analogously. Thus, at time $t_5$, AND member or gate 2 is transmitting as will be clear from the above description for forward counting, and flip-flop 5 is reset while flip-flop 6 is set. If there now follows the state corresponding to time $t_4$, in which the state of input A is "0" and that of input B is "1," AND member or gate 3 becomes transmitting and flip-flop 6 remains set. Through the output of AND member or gate 3 and the second output of reset flip-flop 5, AND member or gate 12 becomes transmitting and, through OR member or gate 17, a signal appears at output line B*o*. At time $t_3$, both inputs A and B have the state "1," so that AND member or gate 1 becomes transmitting and flip-flop 5 is set through its setting input. Through the output of AND member or gate 1 and the first output of said flip-flop 6, AND member or gate 13 becomes transmitting so that there appears, through OR member or gate 18, a signal at output B*e*. At time $t_2$, a signal again appears at output B*o* while, at time $t_1$, an output signal again appears at output B*e*.

Figure 3:
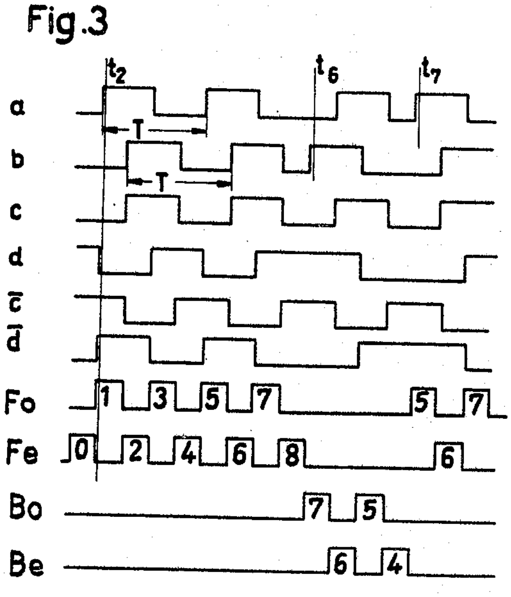
FIG. 3 is a graphical representation of the pulse sequences occurring upon a change of the counting direction.

If, for example, there are applied to the input lines A and B the pulse sequences *a* and *b* shown in FIG. 3, there appear, at the first outputs of flip-flops 5 and 6, the pulse sequences *c* and *d*. At the second outputs of these flip-flops, there appears simultaneously the respective inverter pulse sequences $\overline{c}$ and $\overline{d}$. At the output lines F*o*, F*e* and B*o*, B*e*, there appear the counting pulses which are evaluated by the succeeding counter in accordance with the counter state in the manner indicated. There can also be seen, in FIG. 3, the pulse multiplication effected by the logical network. During a period T of the pulse sequences *a* or *b*, four successive counting pulses are also available at the output lines of the logical network.

As illustrated in FIG. 3 at time $t_6$, a change of counting direction is signaled by pulse sequences *a* and *b*, because the condition in which the state of inputs A and B are both "0" is followed by a condition wherein the state of input A is "0" and that of B is "1" instead of the combination in which the state of input A is "1" and that of input B is "0." Such a changeover of the state combinations of the input lines, however, indicates "backward counting." Thus, there occurs at output B*o* a pulse which the succeeding counter subtracts from the particular counter state so that here, for example, the result is a counter state "7."

The pulses sequences *a* and *b*, at the time $t_6$, still indicate three increments to be subtracted, and which occur alternately at the outputs B*e* and B*o*. At time $t_7$, a change in counting direction is again signaled, so that output lines F*o* and F*e* furnish pulses to a succeeding counter, which are now again to be added.

From the foregoing, it will be seen that the logical network provides counting pulses at its output lines depending on the counting direction, and with a counting pulse at an "odd" output line being always followed by a counting pulse at an "even" output line. This is independent of a sudden change of counting direction, so that even then, after a pulse at an "even" output line, there must always occur a pulse at an "odd" output line and vice versa. The different counting direction of the increment signal generator is signaled by loading of the output lines "forward F" and "backward R," respectively.

The determination as to which of the outputs of the logical network is to be rated as "even" and which is "odd" can be effected by a succeeding counter, which has not been shown, and as a function of the particular position of the increment generator at the start of counting.

While a specific embodiment of the invention has been shown and described in detail to illustrate the application of the principles of the invention, it will be understood that the invention may be embodied otherwise without departing from such principles.

What is claimed is:

1. A logical network for forward-backward counting direction discrimination, with simultaneous pulse multiplication, of two mutually phase-displaced signal sequences of an increment signal generator, said logical network comprising, in combination, a pair of input lines, one for each of said signal sequences, said input lines having the respective momentary binary states A, $\overline{A}$ and B, $\overline{B}$; a series of output lines connectable to the input of a succeeding counter; the momentary binary states of said output lines having the respective designations F*o* for forward odd numbered pulses, F*e* for forward even numbered pulses, B*o* for backward odd numbered pulses and B*e* for backward even numbered pulses; and electronic components, including two flip-flop stages each having a pair of outputs and serving as storage units for the respective preceding state combinations of said input lines, connecting said input lines to said output lines and operable, for the purpose of distinguishing between odd numbered and even numbered increments within an increment sequence, to fulfill the following equations of Boolean algebra:

$$Fo=(\overline{A}\wedge B\wedge C)\vee(A\wedge\overline{B}\wedge\overline{C})$$
$$Fe=(\overline{A}\wedge\overline{B}\wedge D)\vee(A\wedge B\wedge\overline{D})$$
$$Bo=(A\wedge\overline{B}\wedge C)\vee(\overline{A}\wedge B\wedge\overline{C})$$
$$Be=(A\wedge B\wedge D)\vee(\overline{A}\wedge\overline{B}\wedge\overline{D})$$

C, $\overline{C}$ and D, $\overline{D}$ designating the respective states of said flip-flop stages.

2. A logical network, as claimed in claim 1, in which each of said flip-flop stages has two inputs; said electronic components including four AND gates each having a pair of inputs, one connected to each of said input lines; the output of each AND gate being connected to a respective different flip-flop stage input; each AND gate transmitting responsive to a different respective combination of binary states of said input lines.

3. A logical network, as claimed in claim 2, in which said two flip-flop stages comprise a first flip-flop stage and a second flip-flop stage, each flip-flop stage having a set input and a reset input; said AND gates comprising a first AND gate transmitting responsive to the momentary binary state combination A plus B and having its output connected to the set input of said first flip-flop stage, a second AND gate transmitting responsive to the binary state combination $\overline{A}$ plus $\overline{B}$ and having its output connected to the reset input of said first flip-flop stage, a third AND gate transmitting responsive to the binary state combination $\overline{A}$ plus B and having its output connected to the set input of said second flip-flop stage and a fourth AND gate transmitting responsive to the binary state combination A plus $\overline{B}$ and having its output connected to the reset input of said second flip-flop stage.

4. A logical network, as claimed in claim 2, in which said electronic components further include eight additional AND gates arranged in two groups of four additional gates each, comprising a first group for forward counting and a second group for backward counting; each additional AND gate of said first group having a pair of inputs, one connected to the output of a respective first mentioned AND gate and the other connected to a respective output of a respective flip-flop stage; each additional AND gate of said second group having a pair of inputs one connected to the output of a respective one of said first-mentioned AND gates and the other connected to a respective output of a respective flip-flop stage; said additional AND gates being arranged in two pairs in each group; and means connecting the outputs of each pair of additional AND gates to a respective one of said output lines.

5. A logical network, as claimed in claim 4, in which each of said last-named means comprises an OR gate having a pair of inputs each connected to the output of a respective additional AND gate of the associated pair, and each having an output connected to a respective output line.

References Cited

UNITED STATES PATENTS 3,200,340 8/1965 Dunne ---------- 307—232 XR

JOHN S. HEYMAN, Primary Examiner

STANLEY T. KRAWCZEWICZ, Assistant Examiner

U.S. Cl. X.R.

307—222, 232, 295; 328—41, 92, 133; 324—83